United States Patent [19]

Shimada

[11] Patent Number: 4,855,841
[45] Date of Patent: Aug. 8, 1989

[54] RECORDING SIGNAL GENERATING CIRCUIT FOR PRINTING

[75] Inventor: Kazuyuki Shimada, Chofu, Japan

[73] Assignee: Ricoh Company, Ltd., Tokyo, Japan

[21] Appl. No.: 314,287

[22] Filed: Feb. 22, 1989

Related U.S. Application Data

[63] Continuation of Ser. No. 196,314, May 20, 1988, abandoned.

[30] Foreign Application Priority Data

May 25, 1987 [JP] Japan ................................. 62-126034

[51] Int. Cl.⁴ ......................... H04N 1/23; H04N 1/40
[52] U.S. Cl. .................................... 358/296; 358/300; 358/447
[58] Field of Search ............... 358/296, 298, 300, 280, 358/284

[56] References Cited

U.S. PATENT DOCUMENTS

| | | | |
|---|---|---|---|
| 4,387,983 | 6/1983 | Masegi | 355/8 |
| 4,706,130 | 11/1987 | Yamakawa | 358/296 |
| 4,734,782 | 3/1988 | Maeshima | 358/280 |

FOREIGN PATENT DOCUMENTS 8112 1/1981 Japan .
199374 9/1986 Japan .
60480 12/1986 Japan .

Primary Examiner—C. L. Albritton
Assistant Examiner—Scott A. Rogers
Attorney, Agent, or Firm—Cooper & Dunham

[57] ABSTRACT

A recording signal generating circuit for printing comprises a shift register for sequentially storing image information on a predetermined number of consecutive pixels. A recording signal pulse width setting circuit normally sets a pulse width of a recording signal for each of a pixel information to a standard pulse width. The setting circuit sets a pulse width of the recording signal for a pixel positioned at the center of the shift register (a pixel of interest) to a wider pulse width when an isolated black pixel pattern is detected. Alternatively the setting circuit sets a pulse width of the recording signal for one of the pixels just preceding and following the pixel of interest to a narrower pulse width when an isolated white pixel pattern is detected.

17 Claims, 9 Drawing Sheets

RECORDING SIGNAL GENERATING CIRCUIT FOR PRINTING

This is a continuation of application Ser. No. 196,314, filed May 20, 1988, now abandoned.

BACKGROUND OF THE INVENTION

The present invention generally relates to a system for forming images, such as laser printers, copiers and facsimiles, and in particular to a recording signal generating circuit for printing in which a recording signal corresponding to image information is generated, which is provided in an electrostatic recording part of an image forming system.

In conventional image forming systems such as laser printers, copiers, and facsimiles, it is well known that an electrostatic latent image is formed by projecting a laser beam onto a photosensitive substance which is precharged in a main scanning direction and that toner is deposited and then fixed on the formed electrostatic latent image to thereby obtain a recording image in the form of a hard copy of information optically scanned.

In a case where a so-called negative/positive development is employed in such conventional image forming systems, it is very difficult to clearly reproduce an isolated one-pixel point, an isolated line having a one-pixel width and consecutive pairs of black and white lines each having a one-pixel width. In other words, the reproduced images are light, compared with a portion in which a plurality of pixels are successively printed on a sheet of transfer paper in the main scanning direction. This disadvantage arises from properties of the photosensitive substance and developing substance used.

SUMMARY OF THE INVENTION

Accordingly, a general object of the present invention is to provide a novel and useful recording signal generating circuit for printing reproduction in which the above disadvantage has been eliminated.

A more specific object of the present invention is to provide a recording signal generating circuit for printing reproduction in which when a black pixel is isolated in a region of consecutive white pixels, the circuit increases a pulse width of a recording signal for the isolated black pixel, so that a clearer printing reproduction can be obtained for a point formed by the isolated black pixel and for a line having a one-pixel width (such as an oblique line, a horizontal line parallel to a main scanning direction and a vertical line extending in a direction perpendicular to the main scanning direction).

Another object of the present invention is to provide a recording signal generating circuit for printing reproduction in which when a white pixel is isolated in a region of consecutive black pixels, the circuit decreases a pulse width of the recording signal for a black pixel preceding or following the isolated white pixel, so that clearer printing reproduction can be obtained for a white pixel point and for a white pixel line having a one-pixel width (such as an oblique line, a horizontal line parallel to the main scanning direction and a vertical line extending in a direction perpendicular to the main scanning direction).

Yet another object of the present invention is to provide a recording signal generating circuit for printing reproduction in which consecutive pairs of white and black pixel lines each having one-pixel widths can be clearly reproduced.

The above objects of the present invention are achieved by a recording signal generating circuit for the printing reproduction comprising the following circuits. An image information storing circuit sequentially stores image information on a predetermined number of consecutive pixels in synchronism with a pixel clock. One pixel positioned at the center of the consecutive pixels is a pixel of interest. An isolated black pixel discriminating circuit discriminates an isolated black pixel pattern in which the pixel of interest is a black pixel and the other pixels in the storing circuit which precede and follow the pixel of interest are all white pixels. An isolated white pixel discriminating circuit discriminates an isolated white pixel pattern in which the pixel of interest is a white pixel and the other pixels in the storing circuit which precede and follow the pixel of interest are all black pixels. A recording signal pulse width setting circuit sets a pulse width of a recording signal for each of the pixels to a standard pulse width when the isolated black pixel discriminating circuit and the isolated white pixel discriminating circuit detect no isolated black and white pixel patterns, respectively. And, the setting circuit sets a pulse width of the recording signal for the pixel of interest to a wider pulse width when the isolated black pixel pattern is detected. The setting circuit also sets a pulse width of the recording signal for one of the pixels just preceding and following the pixel of interest to a narrower pulse width when the isolated white pixel pattern is detected.

Other objects, features and advantages of the present invention will become apparent from the following detailed description when read in conjunction with the accompanying drawings.

DETAILED DESCRIPTION

Figure 1:
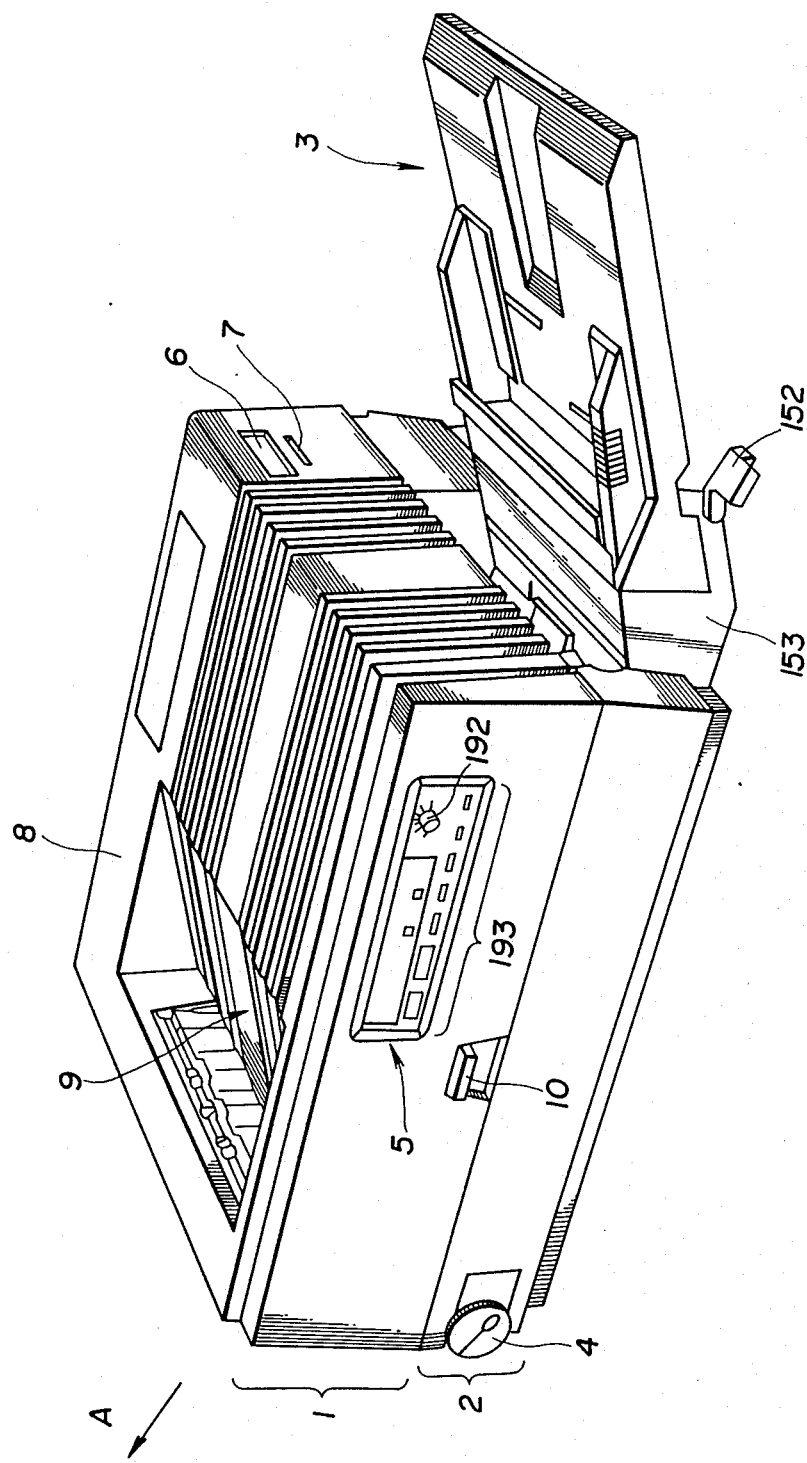
FIG. 1 is a general perspective view of a laser printer to which the present invention is applicable.

Referring to FIG. 1, a laser printer is generally composed of a printer upper unit 1 and a printer lower unit 2. The printer lower unit 2 is provided with a paper feed tray 3 which is detachably attached thereto for accommodating sheets of transfer paper, and a paper discharge switching knob 4. The printer upper unit 1 is provided with an operation panel 5, a font cartridge inserting entrance 6 and an emulation card inserting entrance 7.

An upper paper discharge tray 9 is mounted on an upper plane of a cover 8.

On the operation panel 5, there are disposed switches and the like used for setting various printing conditions including a size of transfer paper. A cartridge (not shown) in which a font cartridge, namely, a cartridge which stores information on the form of a character, is inserted into the font cartridge inserting entrance 6. Information read out from the inserted font cartridge is transferred to a character controller described later.

The emulation card inserting entrance 7 is used for connecting an emulation card with the character controller. The emulation card is used for establishing conformity between the present laser printer and a host computer system, depending on the type of host computer system used.

The paper discharge switching knob 4 is used for selecting either one of two paper discharge paths. One of them is a path on which paper which has been subjected to the printing operation is discharged towards the upper paper discharge tray 9, and the other is a straight path on which the paper is discharged in a direction of an arrow A.

The printer upper unit 1 and the printer lower unit 2 are hinge-coupled with each other on a rear side of the laser printer, and may be fastened to each other on a front side thereof by means of a lock mechanism.

Figure 2:
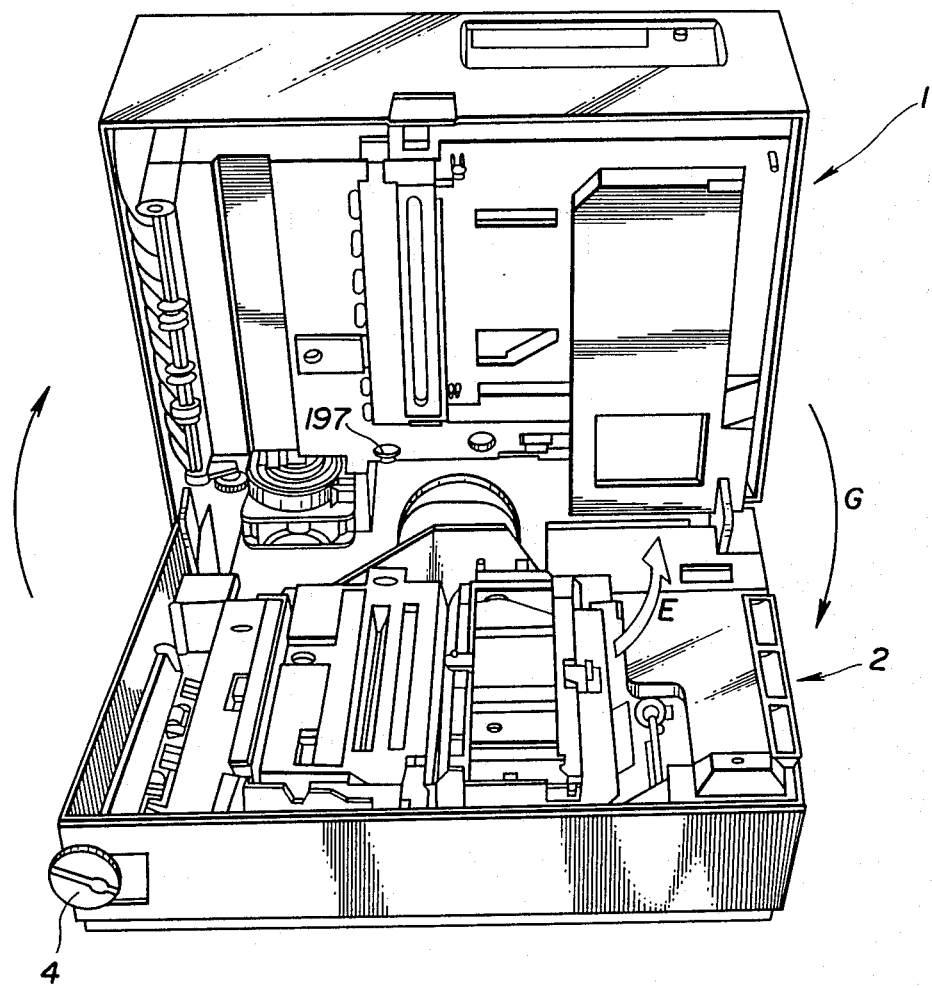
FIG. 2 is a perspective view of the laser printer of FIG. 1 in a state where a printer upper unit is opened.

When releasing the lock mechanism by pushing up a lock lever knob 10 projecting from the front surface of the cover 8, as shown in FIG. 2, the printer upper unit 1 may be rotatably raised from the printer lower unit 2. This two-divisional structure enables easier maintenance operations and easier exchanging operations for the photosensitive substance, developing agent and the like.

Figure 3:
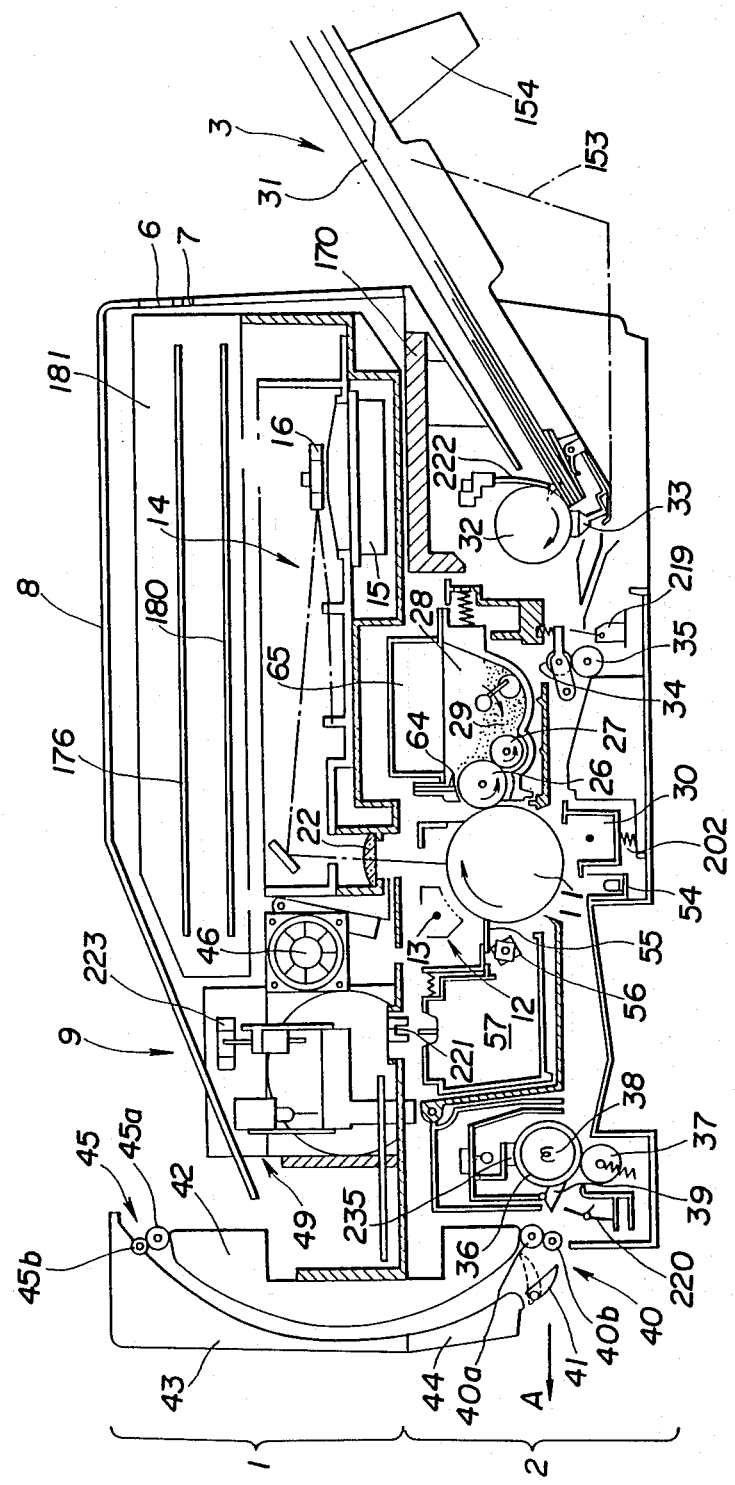
FIG. 3 is an elevational cross sectional view of the laser printer of FIG. 1 in a state where the printer upper unit and a printer lower unit are completely fitted together.

Referring to FIG. 3, a drum-shaped photosensitive member (hereafter referred to as a photosensitive drum) 11 located generally in the center of the printer lower unit 2 is rotated clockwise. At the commencement of operation, the photosensitive drum 11 is subjected to a charge removing process implemented by a corona charger 12. A charge wire 13 in the corona charger 12 is stretched in parallel to an axis of the photosensitive drum 11, and an atomsphic electric discharge which is raised between the photosensitive drum 11 and the charge wire 13 enables a peripheral surface of the photosensitive drum 11 to be uniformly charged.

Figure 4:
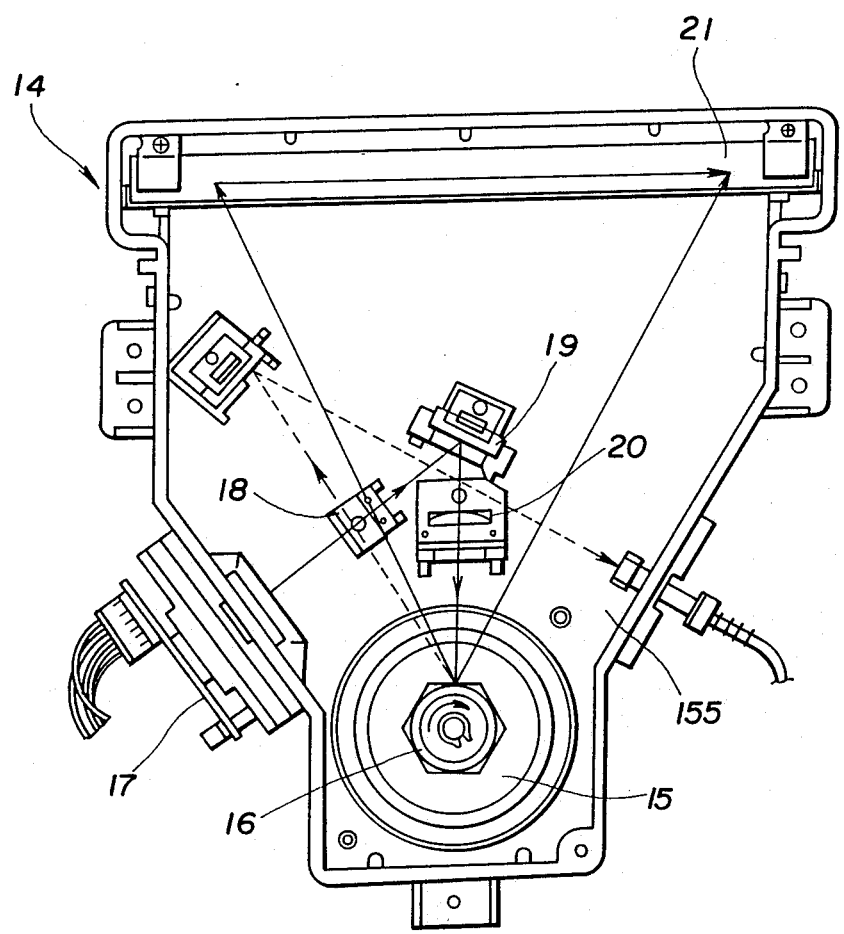
FIG. 4 is a plan view of a laser optical unit installed in the laser printer of FIG. 1.

The photosensitive drum 11 in the charged state is then subjected to an image exposing process by a laser exposing device 14. As shown in FIG. 4, the laser exposing device 14 comprises a polygon mirror 16 which is rotated clockwise by a scanner mother 15, a laser diode unit (hereafter simply referred to as a LD unit) 17, a first cylindrical lens 18, a first mirror 19, a spherical lens 20 and a second mirror 21.

Figure 5:
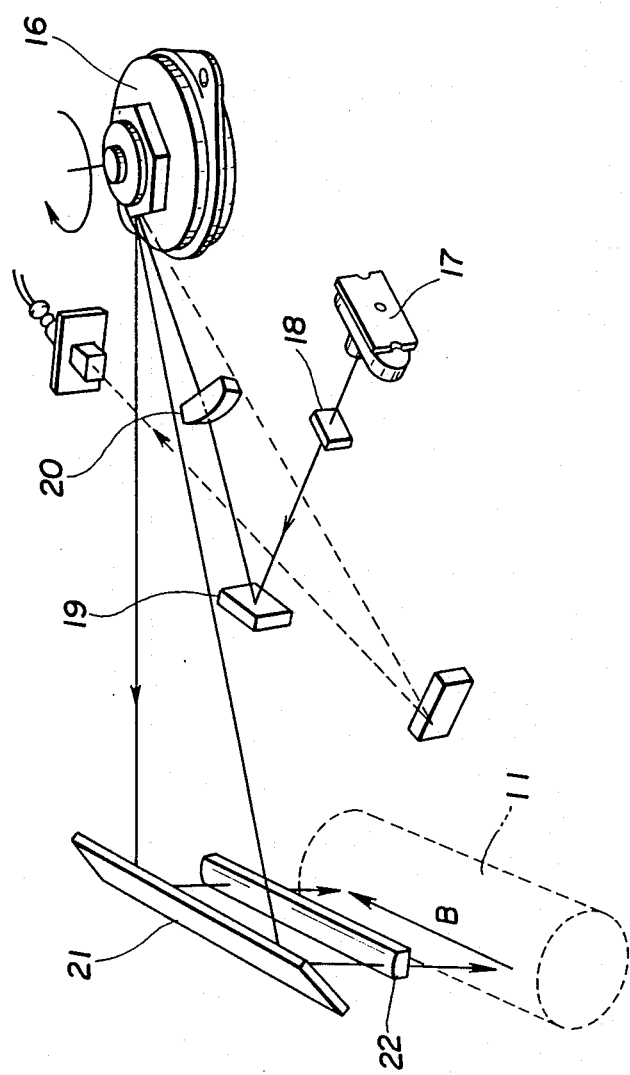
FIG. 5 is a view for showing an optical path of the laser optical unit shown in FIG. 4.

A semiconductor laser diode is built into the LD unit 17, which emits a laser beam for image signal writing in response to an image signal. As shown in FIG. 5, the laser beam passes through the first cylindrical lens 18 and the first mirror 19, and then enters the spherical lens 20. The laser beam is converged and is slightly refracted upwards by the spherical lens 20, and is then projected onto a plane of the polygon mirror 16.

Then the laser beam is reflected onto the second mirror 21, and passes through the second cylindrical lens 22, and is directed onto the photosensitive drum 11. At this time, the laser beam scans the second mirror 21, and correspondingly the photosensitive drum 11 is scanned in the main scanning direction in accordance with the rotation of the polygon mirror 16. This optical scan is repetitively carried out for every plane of the polygon mirror 16. During the optical scan, the photosensitive drum 11 is rotated in a direction orthogonal to the main scanning direction, i.e., a sub-scanning direction. As a result, an electrostatic latent image corresponding to the image signal is formed on the peripheral surface of the photosensitive drum 11.

The semiconductor laser used in the present embodiment can emit a light beam having a single wavelength of $780\pm10$ nm at ordinary temperatures. However, generally, a sensitive range of photosensitive substance is much lower than the above value of the wavelength, and most of photosensitive substances have a peak of the sensitivity lower than a wavelength of 500 nm. Additionally, since the laser beam is coherent and has a single wavelength, multi-exposure occurs arising from light components which are reflected onto a base (made of aluminum, for example) of the photosensitive drum. This multi-exposure causes a disadvantageous effect called moire. Moreover, a light energy which is received by photosensitive substance is defined by a product of the quantity of light and time. Some photosensitive substances have a property in accordance with a reciprocity law, wherein light sensitivity thereof varies by changing values of the light quantity and time even when the light energy is the same. As will be apparent from the following description, the present embodiment controls the light quantity of the light beam emitted by the laser diode, depending on a position onto which the light beam is to be projected.

The photosensitive substance employed in the present embodiment is OPC photosensitive substance using an organic substance, and an aluminum drum is used as the base of the drum 11. On the peripheral surface of the base, there is formed an under-coating layer which is made of an alcohol soluble polyamide region containing titanium dioxide which is one of white pigments and which has a thickness of approximately 3–4 $\mu$m. Further on the peripheral surface of the under layer, there is coated an intermittent layer made of a trisazo pigment having a thickness of approximately 0.2 $\mu$m. The intermittent layer serves as a charge generating layer which absorbs light and generates corresponding charge carriers. On the peripheral layer of the intermittent layer, there is coated an upper layer made of an $\alpha$-phenylstilbene system compound. The upper layer has a thickness of approximately 22 $\mu$m, and serves as a charge transportation layer for transporting the charge carriers generated in the charge generating layer. The sensitivity characteristic of the photosensitive drum thus formed has a peak in the vicinity of a wavelength of 750 nm, and exhibits sufficient sensitivity even in a range from 500 nm to 820 nm. The drift mobility (responsibility) of the OPC photosensitive substance containing an $\alpha$-phenylstilbene system compound is excellent and does not have the reciprocity law. Titanium dioxide which is a white pigment plays an important role to prevent the occurence of the moire layer.

In order to generate a synchronization pulse, a synchronization detecting sensor (not shown) detects, for every scan of the main scan, a specific position where the laser beam passes through. A synchronization clock used for controlling the image writing and so on is produced in response to an output signal of the synchronization detecting sensor. In FIG. 3, the electrostatic latent image formed on the peripheral surface of the photosensitive drum 11 by the laser exposing device 14 is transferred to a developing roller 26 by the rotation of the photosensitive drum 11. The developing roller 26 is rotated counterclockwise while being kept in light contact with the peripheral surface of the photosensitive drum 11. At this time, the developing roller 26 is being supplied with toner 29 accommodated in a developing tank 28 by a toner supply roller 27, which is disposed in a bottom portion of the developing tank 28 and rotates counterclockwise. With this structure, the electrostatic latent image which is formed on the peripheral surface of the photosensitive drum 11 and has been carried up to the developing roller 26 is developed by the toner transferred by the toner supply roller 27, so that a corresponding visual image is formed.

This toner image is then transferred to a transfer position which faces a transfer charger 30. A reference numeral 64 denotes a toner layer thickness limiting blade, and 65 denotes a toner cartridge.

During the above-described processes, a sheet of transfer paper which is one sheet out of stacked sheets of transfer paper 31 and is located at top thereof is separated from the other stacked sheets by a cooperative function of a paper feed roller 32 rotated in the clockwise direction and a friction pad 33 which is kept in contact with the paper feed roller 32 with a certain pressure. The separated sheet of paper is fed to a contacting part of upper and lower transportation rollers 34 and 35, and is further transported to the transfer position of the photosensitive drum 11.

The transported transfer paper is brought into contact with the toner image formed on the peripheral surface of the photosensitive drum 11 at the transfer position, and is then subjected to discharge by the transfer charger 30. The toner image formed on the photosensitive drum 11 is transferred to the transfer paper due to a function of the discharge. When the image transferring process is completed, light derived from a charge removing lamp 54 arranged next to the transfer charger 30 is passed through the transfer paper and is then projected onto the peripheral surface of the photosensitive drum 11, so that a surface potential of the photosensitive drum 11 and a charge potential of the transfer paper occurring at the time when it passes over the transfer charger 30 are both weakened due to the discharging function.

The transfer paper with the potential having been weakened is separated from the photosensitive drum 11 due to its own weight, and is then fed to a heat fixing device equipped with a heating roller 36 and a pressure roller 37. A pressure is applied to both the upper and lower surfaces of the transfer paper and the toner image formed thereon by the cooperating rollers 36 and 37, while being heated by the heating roller 36, so that the toner image is solved and is fixed on the transfer paper. A heater 38 is installed in the heating roller 36 in order to heat the same.

After the toner image fixing is completed, the transfer paper is peeled from the heating roller 36 by a peeling pawl 39 and is then fed to a paper discharge roller 40. A paper discharge switching pawl 41 is disposed at a downstream position with respect to the paper discharge roller 40. The switching pawl 41 is used for switching between the positions indicated by a solid line and a broken line shown in FIG. 3 by turning the paper discharge switching knob 4. When the switching pawl 41 is located at the position indicated by the solid line, the transfer paper discharged from the discharge roller 40 moves along a path formed by a paper discharge guide member 42 and a paper discharge guide plate 43 and 44, and is then discharged towards the upper discharge tray 9 by the upper discharge roller 45. On the other hand, when the switching pawl 41 is located at the position shown by the broken line, the transfer paper from the paper discharge roller 40 is directly discharged in the direction of the arrow A.

Toner which did not contribute to the image transfer and still remains on the peripheral surface of the photosensitive drum 11 is discharged by a charge removing lamp 54, and is then scraped from the peripheral surface of the photosensitive drum 11 by a cleaning blade 55. The scraped toner is fed to a toner recovery tank 57 by a toner collecting roller 56. The photosensitive drum 11 which has been cleaned by the cleaning blade 55 is charged again by the corona charger 12.

The heating roller (image fixing roller) 36 is made electrically conductive in the peripheral surface thereof. The charge on the transfer paper passes through the conductive surface of the heating roller 36, and is thereby removed. The electrically conductive image fixing roller 36 may be obtained by using a carbon mixed under layer which is made of Teflon (registered trademark) or the like.

The paper feed tray 3 is detachably mounted to the printer lower unit 2. The paper feed tray 3 has an overhanging portion 153 which overhangs downwards and is provided with a depression lever 152 (FIG. 1). A projection 154 is mounted at an rear portion of the overhanging portion 153. With this structure, the paper feed tray 3 can be more steadily and tightly attached to the printer lower unit 2, so that paper can be prevented from moving downwards out of position. As shown in FIG. 3, an inner cover 170, loaded in a predetermined position, covers the paper feed roller 32 to prevent dust and the like from being deposited on the paper feed roller 32, and additionally to protect the paper feed roller 32 against accidental damage when raising the printer upper unit 1.

Figure 6:
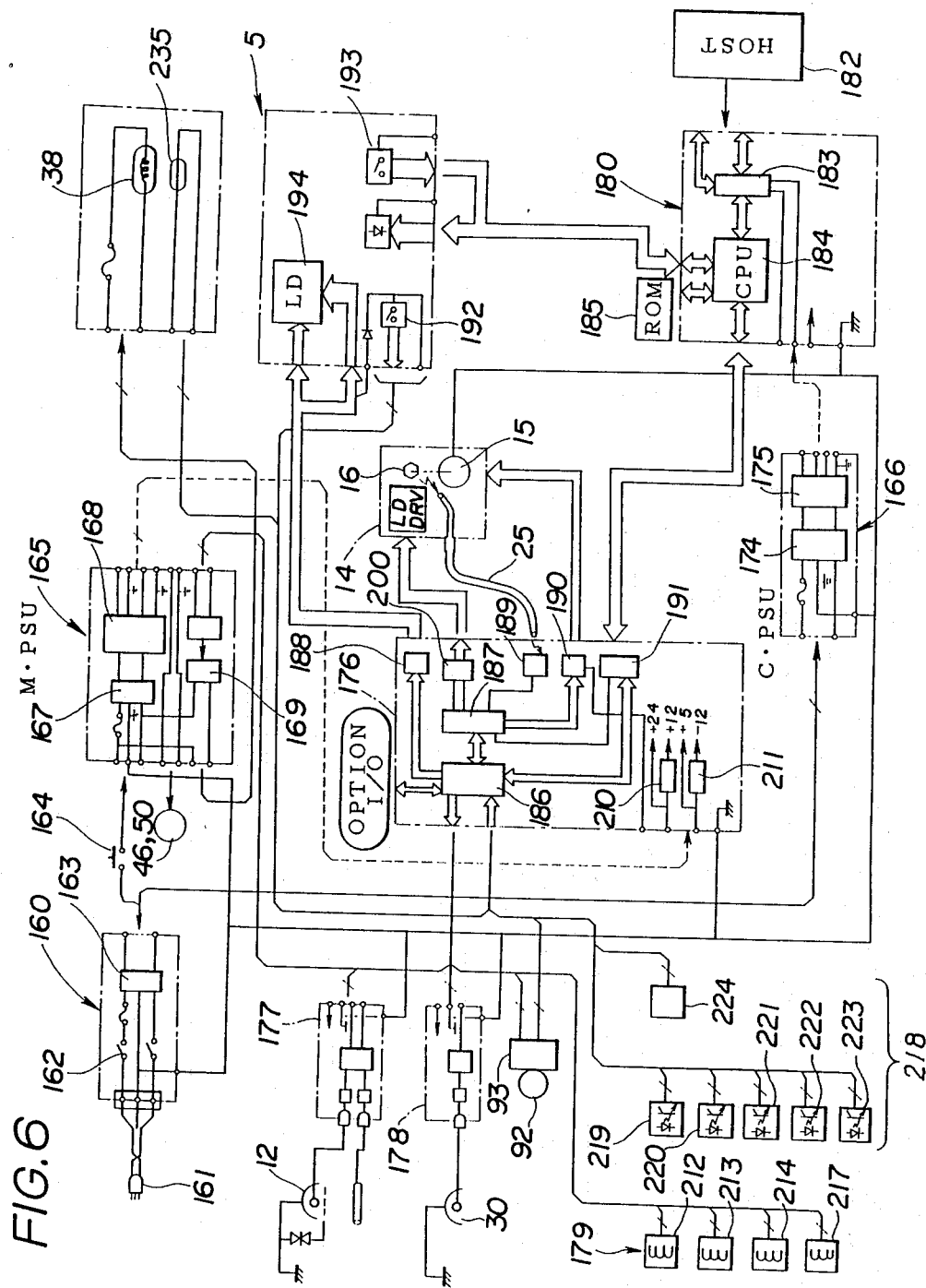
FIG. 6 is an electric control circuit installed in the laser printer of FIG. 1.

A description is now given of a control circuit provided in the laser printer, by referring to FIG. 6.

In FIG. 6, a power input part 160 is connected to a commercial power source via an AC plug 161, and includes therein a main switch 162 and a noise filter 163. The power from the power input part 160 is supplied, on the one hand, to a power supply part 165 for a main controller via an interlock switch 164 and, on the other hand, to a power supply part 166 for a character controller.

The power supply part 165 for the main controller comprises a noise filter 167, a constant voltage circuit 168 and a semiconductor relay 169.

The constant voltage circuit 168 mainly performs AC/DC conversion, and drives a main controller 176, the corona charger 12, a power pack 177 for the developing bias, a power pack 178 for the transfer charger 30, a main motor 92, various devices 179 (a paper feed crutch 212, a paper transportation crutch 213, a total counter solenoid 214, a latching solenoid 217) and so on. The semiconductor relay 169 controls ON/OFF states of the power supply for temperature control for the heater 38 installed in the heating roller 36.

The heater 38 is equipped with a thermistor 235, which is located close to a position through which a minimum width transfer member such as an envelope would pass and is used for performing a temperature control with accuracy.

The interlock switch 164 is turned OFF and stops the power supply for the power supply part 165 for the main controller when the printer upper unit 1 is raised.

The power supply part 166 for the character controller comprises a noise filter 174 and a constant voltage circuit 175, and drives the character controller indicated by a reference numeral 180.

The main controller 176 is, as shown in FIG. 3, attached to an electric part chassis 181 provided in the printer upper unit 1, and controls all of the printer processes such as the above-described corona charge, exposure, development, transfer and so on. Additionally, the main controller 176 comprises a central processing unit (hereafter simply referred to as a CPU) 186, a phase synchronization part 187, a display driving part 188, a scanner synchronization detecting part 189, a scanner motor driver 190, a wide interface 191 and a recording signal generating part 200. This recording signal generating part 200 provides essential features of the present invention, and will be described in detail later.

The character controller 180 is fastened to the electric part chassis 181 to which the main controller 176 is also fastened, and sends character information supplied from a host computer 182 to the CPU 184 via the interface part 183. The CPU 184 produces a character signal corresponding to the character information.

The display driving part 188 is used for driving the operation panel 5. As shown in FIG. 1, the operation panel 5 is provided with a rotary type switch 192 for indicating to the CPU 186 information on size of the transfer paper placed on the paper feed tray 3, a button switch 193 for indicating various instructions to the character controller 180, and a group of light-emitting diodes (LEDs) 194 for indicating various indicators.

The phase synchronization part 187 drives the laser diode LD in the laser developing apparatus 14 in synchronization with the print process executed by the CPU 186. And the the phase synchronization part 187 receives an synchronization detecting signal from a optical fiber 25 via the synchronization detecting part 189, and controls a timing of light-emitting of the laser diode LD. Further, the phase synchronization part 187 controls the scanner motor 15 via the scanner motor driver 190.

The video interface part 191 carries out data transmission/reception with respect to the character controller 180, and supplies the character controller 180 with a clock signal which is a reference for the controlling operation.

The main controller 176 comprises two voltage converting parts 210 and 211, each of which comprises a three-terminal regulator, a DC/DC converter and so on. The voltage converting parts produces various voltages for controlling motors for driving respective devices and the solenoids.

As an input device for supplying a signal which provides a reference for the processes to the CPU 186 in the main controller 176, there is provided a resist sensor 219, a paper discharge sensor 220, a toner-over sensor 221, a paper end sensor 222, a latch sensor 223 and a toner end sensor 224.

Figure 7:
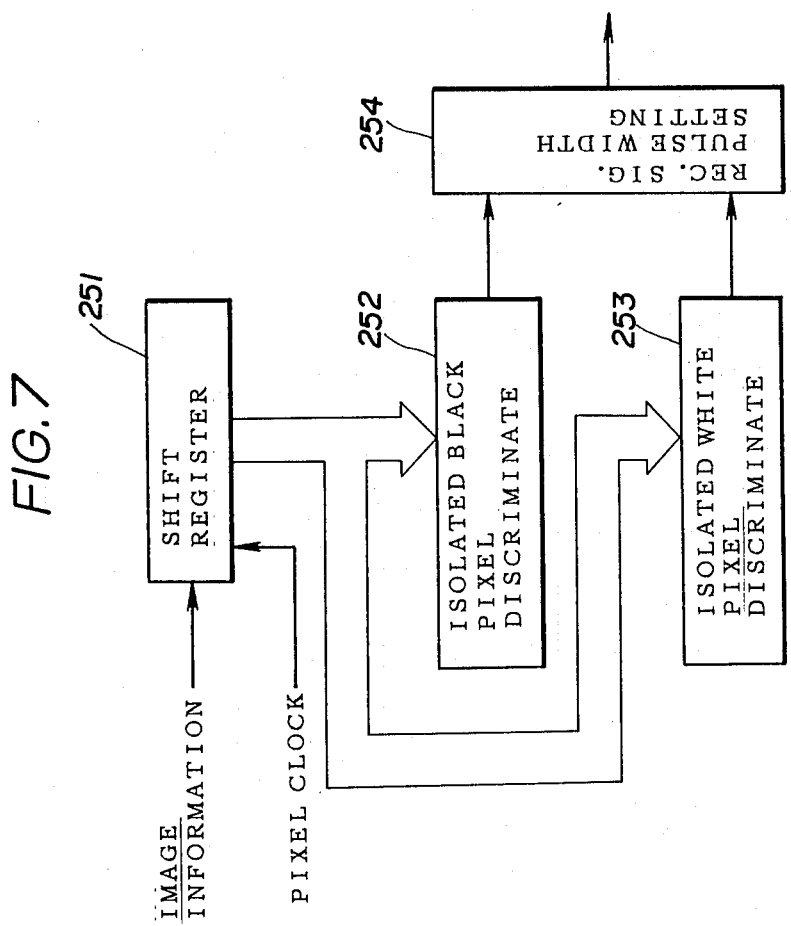
FIG. 7 is a block diagram of an image signal processing circuit for printing reproduction of the present invention.

A description is given of the recording signal generating part 200 which is an essential part of the present invention, by referring to FIG. 7.

In FIG. 7, input image information is sequentially applied to a shift register 251 in synchronism with a pixel clock. An isolated black pixel discriminating circuit 252 investigates a relationship between a center pixel (a pixel of interest) and other pixels stored in the shift register 251, and detects an isolated black pixel positioned between preceding and following white pixels (an isolated black pixel pattern). An isolated white pixel discriminating circuit 253 investigates a relationship between a certain pixel, i.e., a pixel of interest and other pixels in the shift register 251, and detects an isolated white pixel positioned between preceding and following black pixels (an isolated white pixel pattern). A recording signal pulse width setting circuit 254 sets a pulse width of a recording signal, depending on discriminated results from the isolated black and white discriminating circuits 252 and 253. When the isolated black pixel is detected by the isolated black pixel discriminating circuit 252, the setting circuit 254 sets a relatively wide pulse width of the recording signal. When the isolated white pixel is detected by the isolated white pixel discriminating circuit 253, the setting circuit 254 sets a relatively narrow pulse width of the recording signal.

Figure 8:
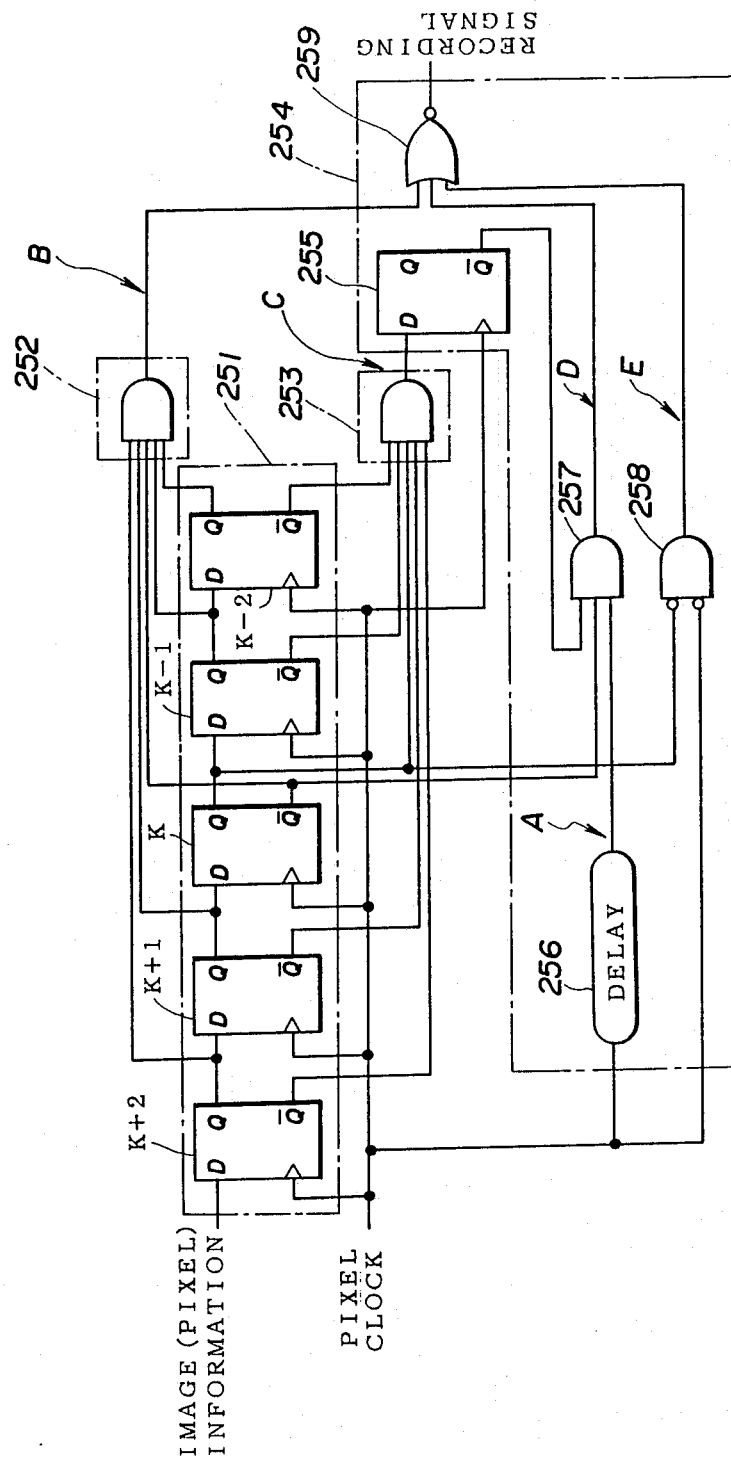
FIG. 8 is a circuit diagram of a detailed circuit configuration of the image signal processing circuit of the present invention.
Figure 9:
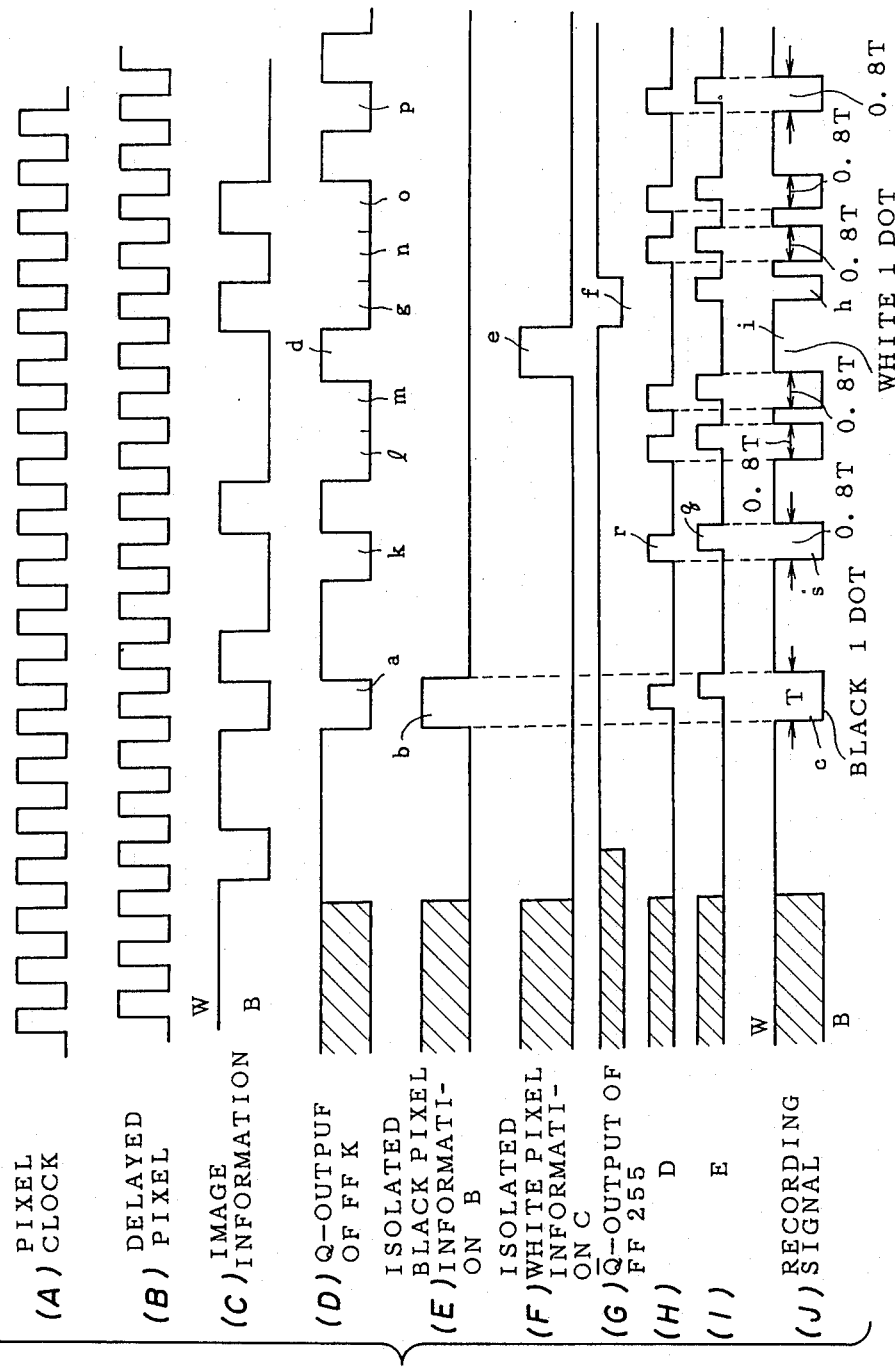
FIGS. 9(A) through 9(J) are views for showing waveforms and timings of different signals in the circuit shown in FIG. 8.

Referring to FIG. 8 showing a detailed circuit configuration of the recording signal controlling part 200, the shift register 251 comprises five D-type flip-flops $K-2$, $K-1$, $K$, $K+1$ and $K+2$ which are cascade-connected. The input image information is applied to the flip-flop $K-2$ located at the first stage of the shift register 251. The pixel clock is supplied to all the flip-flops. Five consecutive pixel information data included in one line of the image information are sequentially inputted to the shift register 251 in response to the pixel clock. The isolated black pixel discriminating circuit 252 consists of an AND circuit, inputs of which are connected to a Q-output terminal of the flip-flop K located at the center of the shift register 251 and to $\overline{Q}$-output terminals of the other shift-registers $K-2$, $K-1$, $K+1$ and $K+2$. The AND circuit of the isolated black pixel discriminating circuit 252 performs an AND operation between signals applied thereto. When the center flip-flop K has black pixel information and all the other flip-flops $K-2$, $K-1$, $K+1$ and $K+2$ have white pixel information, an isolated black pixel information pulse at a high level as shown in FIG. 9(E) is produced. The isolated black pixel information signal thus produced has a pulse width (a 100% pulse width T of a period T of the pixel clock shown in FIG. 9(A)) corresponding to a pulse width of one pixel of the input image imformation shown in FIG. 9(C).

The isolated white pixel discriminating circuit 253 consists of an AND circuit, one input terminal of which is connected to an $\overline{Q}$-terminal of the center flip-flop K, and the others are connected to Q-terminals of the other flip-flops $K-2$, $K-1$, $K+1$ and $K+2$. The AND circuit performs an AND operation between input signals applied thereto. When the center flip-flop K has white pixel information, and the other flip-flops $K-2$, $K-1$, $K+2$ and $K+2$ have black pixel information, an isolated white pixel information pulse at a high level as shown in FIG. 9(F) is produced.

The recording signal pulse width setting circuit 254 comprises a D-type flip-flop 255, a delay circuit 256, an AND circuit 257, a NOT-AND circuit 258 and a NOR circuit 259. The D-type flip-flop 255 makes its $\overline{Q}$-output terminal low with one-pixel clock delay, when the isolated white pixel information pulse shown in FIG. 9(F) is generated, that is, switched to a high level. The delay circuit 256 delays the pixel clock of FIG. 9(A) during a predetermined period. The AND circuit 257 is used for generating a recording signal having a pulse width when a pattern is detected other than the pattern in which one black pixel is put between white pixels and the pattern in which one white pixel is put between white pixels. At this time, a recording signal has a standard pulse width which corresponds to 80% of a period T of one pixel clock, i.e., 0.8T. The NOT-AND circuit 258 is used for generating a recording signal having a pulse width corresponding to 50% of one period T, i.e., 0.5T from the $\overline{Q}$-output signal of the flip-flop K and the pixel clock of FIG. 9(A). The NOR circuit 259 generates a finalized recording signal from the output signals of the AND circuits 252, 257 and the NOT-AND circuit 258.

A description is given of operation of the recording signal generating part 200.

In the present embodiment, the pulse width of the recording signal related to pixel information existing in the flip-flop K is set to either one of three different pulse widths, depending on the pixel information pattern in the shift register 251. That is, when the pattern of the image information stored in the shift register 251 is such that the center flip-flop K stores black pixel information and the other flip-flops K−2, K−1, K+1 and K+2 store white pixel information, the recording signal having a relatively wide pulse width (100% pulse width recording signal) is generated, and the recording of the black pixel information stored in the flip-flop K is performed. When the pattern in the shift register 251 is such that the center flip-flop K stores white pixel information and the other flip-flops K−2, K−1, K+1 and K+2 store the black pixel information, the recording signal having a relatively narrow pulse width (50% pulse width recording signal) is generated with a time delay amounting to one pixel clock, and the recording of the black pixel information stored in the flip-flop K+1 is performed. When the pattern is a pattern other than the two above patterns, the recording signal having the standard pulse width (80% pulse width recording signal) is generated, and the recording of the black pixel information in the flip-flop K is carried out. In this manner, the pulse width of the recording signal is increased with respect to the standard pulse width at the time of recording one pixel included in a pattern such that the black pixel is isolated in the group consisting of white pixels, and is on the other hand decreased with respect to the standard pulse width at the time of recording one black pixel following one white pixel included in a pattern such that the white pixel is isolated in the group consisting of black pixels.

The clock input terminals of the shift register 251 are supplied with the pixel clock (A), and the image information is shifted in response to the pixel clock. It is now assumed that as shown in FIG. 9(C), the image information has a pattern such as W-W-W-B-W-W-B-W-B-B-W-B-B-B-W-B-W-B-B ("B" indicates one black pixel and "W" indicates one white pixel) in this sequence. The Q output signal of the flip-flop K is information to be recorded (hereafter referred to as pixel information of interest). The contents of the flip-flops K−2, K−1, K+1 and K+2 are neighboring pixel information which precede or follow the pixel information of interest stored in the flip-flop K.

GENERATION OF RECORDING SIGNAL OF ISOLATED BLACK PIXEL

When the first black pixel a in the pattern shown in FIG. 9(C) has just been shifted to the flip-flop K, all the contents of the other flip-flops K−2, K−1, K+1 and K+2 are white pixels. Therefore, as shown in FIG. 9(E), the isolated black pixel discriminating circuit 252 outputs a pulse b at a high level. The pulse width of the pulse b is equal to the time width T of the one pixel clock shown in FIG. 9(A). The pulse b at the high level is inputted to the NOR circuit 259, which generates a recording signal c of the isolated black pixel having the time width T, as shown in FIG. 9(J).

GENERATION OF RECORDING SIGNAL OF BLACK PIXEL FOLLOWING ISOLATED WHITE PIXEL

When the flip-flop K has a white pixel d and the other flip-flops have black pixels, the isolated white pixel discriminating circuit 253 outputs a pulse e as shown in FIG. 9(F). The state of the flip-flop 255 is altered in response to the pulse e, and therefore as shown in FIG. 9(G), a pulse f at a low level is generated at the Q-output terminal of the flip-flop 255. Therefore, while the pulse f is maintained at the low level, as shown in FIG. 9(H), the output signal of the AND circuit 257 is kept at the low level irrespective of levels of the other input signals thereof. On the other hand, the NOT-AND circuit 258 is supplied with the pixel clock and the $\overline{Q}$-output signal of the flip-flop K. Therefore, while the flip-flop K has the black pixel information and the pixel clock is within the latter half cycle thereof, the output signal of the NOT-AND circuit 258 is maintained high, as shown in FIG. 9(I). At the time of the recording of the black pixel following the above isolated white pixel, the isolated black pixel discriminating circuit 252 and the AND circuit 257 are both maintained at the low level, and only the NOT-AND circuit 258 is kept at the high level during the 0.5T period of the latter half of the pixel clock (in the present embodiment, a duty ratio of the pixel clock is set to 0.5T). Therefore, as indicated by h in FIG. 9(J), the recording signal which is the output signal of the NOR circuit 259 is formed so as to have the pulse width 0.5T which is shorter than the standard pulse width 0.8T. As a result, the recording time of the black pixel following the isolated white pixel is decreased and therefore, the recording of the isolated white pixel is emphasized, compared to the recording of the white pixel which is not isolated.

GENERATION OF RECORDING SIGNAL FOR PATTERNS OTHER THAN ISOLATED BLACK AND WHITE PIXELS

When the pixel pattern stored in the shift register 251 is a pattern other than the isolated white pixel pattern and the isolated black pixel pattern, the isolated black pixel discriminating circuit 252 generates no output signal. The isolated white pixel discriminating circuit 253 also generates no output signal. Therefore, the flip-flop 255 is not inverted, and the output signal thereof is kept at the high level. The delay circuit 256 is used for delaying the pixel clock by a predetermined constant time (0.2T in the present embodiment), and the output signal thereof shown in FIG. 9(B) is inputted to the AND circuit 257. The AND circuit 257 performs the AND operation of the $\overline{Q}$-output signal of the flip-flop K, the $\overline{Q}$-output signal of the flip-flop 255, and the delayed pixel clock shown in FIG. 9(B). Then the AND circuit 257 generates the output signal at the high level, while the flip-flop K has the black pixel information and therefore generates the $\overline{Q}$-output signal at the high level (the inverted output pulses corresponding to pulses k, l, m, n, o and p) and also while the delayed pixel clock is in the positive half cycle.

On the other hand, as shown in FIG. 9(I), the output signal of the NOT-AND circuit 258 is kept at the high level during the latter half cycle of the pixel clock when the flip-flop K has the black pixel information.

The output signals of the isolated black pixel discriminating circuit 252, AND circuit 257 and NOT-AND circuit 258 are supplied to the NOR circuit 259, which generates a recording signal which is a result of the NOR operation. That is, this recording signal shown in FIG. 9(J), corresponds to a signal obtained by superposing waveforms shown in FIGS. 9(H) and 9(I) and then inverting a superposed waveform thus obtained. For a black pixel k which is not isolated, the output signal g of the AND circuit 257 and the output signal r of the NOT-AND circuit 258 are somewhat out of phase, namely, the rising edge of both the pulses does not occur simultaneously. Therefore, the standard pulse s having a pulse width of 0.8T can be obtained from the NOR circuit 259.

In the above embodiment, the pulse width of the recording signal of the black pixel following the isolated white pixel is decreased when the isolated white pixel is detected. Instead, the pulse width of the recording signal just preceding the isolated white pixel may be decreased when the isolated white pixel is detected.

The present invention is not limited to the above-described embodiment, but various variations and modifications may be made without departing from the scope of the present invention.

What is claimed is:

1. A recording signal generating circuit for printing in which a recording signal corresponding to image information is generated, comprising:

storing means for sequentially storing image information on a predetermined number of consecutive pixels in synchronism with a pixel clock, one pixel positioned at the center of the consecutive pixels being a pixel of interest;

isolated black pixel discriminating means for discriminating an isolated black pixel pattern in which the pixel of interest is a black pixel and the other pixels in the storing means preceding and following the pixel of interest are all white pixels;

isolated white pixel discriminating means for discriminating an isolated white pixel pattern in which the pixel of interest is a white pixel and the other pixels in the storing means preceding and following the pixel of interest are all black pixels; and recording signal pulse width setting means for setting a pulse width of a recording signal for each of the pixels to a standard pulse width when the isolated black pixel discriminating means and the isolated white pixel discriminating means detect no isolated black and white pixel patterns and for setting a pulse width of the recording signal for the pixel of interest to a wider pulse width when the isolated black pixel pattern is detected and for setting a pulse width of the recording signal for one of the pixels just preceding and following the pixel of interest to a narrower pulse width when the isolated white pixel pattern is detected.

2. A recording signal generating circuit as claimed in claim 1, wherein the storing means comprises a plurality of shift registers which are cascade-connected.

3. A recording signal generating circuit as claimed in claim 2, wherein each of the shift registers is constituted by a D-type flip-flop.

4. A recording signal generating circuit as claimed in claim 3, wherein each of the D-type flip-flops is supplied with the pixel clock.

5. A recording signal generating circuit as claimed in claim 4, wherein the isolated black pixel discriminating circuit is constituted by an AND circuit which receives a $\overline{Q}$-output signal of the flip-flop for the pixel of interest and Q-output signals of the other flip-flops, and the isolated white pixel discriminating circuit is constituted by an AND circuit which receives a Q-output signal of the flip-flop for the pixel of interest and $\overline{Q}$-output signals of the other flip-flops.

6. A recording signal generating circuit as claimed in claim 5, wherein the recording signal pulse width setting means comprises a D-type flip-flop, a delay circuit, an AND circuit, an NOT-AND circuit and a NOR circuit, and wherein the pixel clock is supplied to the flip-flop, the delay circuit and the NOT-AND circuit, and wherein an output signal of the AND circuit of the isolated black pixel discriminating circuit is supplied to the NOR circuit, and an output signal of the AND circuit of the isolated white pixel discriminating circuit is supplied to the flip-flop of the setting means, and wherein an output signal of the delay circuit, the $\overline{Q}$-output signal of the flip-flop for the pixel of interest and a Q-output signal of the flip-flop of the setting means are supplied to the AND circuit in the setting means, and wherein the Q-output signal of the flip-flop for the pixel of interest is supplied to the NOT-AND circuit, and wherein output signals of the NOT-AND circuit and AND circuit in the setting means are supplied to the NOR circuit, so that the recording signal is outputted from the NOR circuit.

7. A recording signal generating circuit as claimed in claim 1, wherein the standard pulse width is narrower than a pulse width of the pixel clock.

8. A recording signal generating circuit as claimed in claim 1, wherein the standard pulse width is narrower than a pulse width of the pixel clock, and wherein the recording signal pulse width setting means sets the pulse width of the recording signal for the pixel of interest to a pulse width identical to that of the pixel clock, when the isolated black pixel pattern is detected.

9. A recording signal generating circuit as claimed in claim 1, wherein the standard pulse width is narrower than that of the pixel clock, and wherein the recording signal pulse width setting circuit sets the pulse width of the recording signal for one of the pixels just preceding and following the pixel of interest to a pulse width which is narrower than that of the standard pulse width, when the isolated white pixel pattern is detected.

10. A recording signal generating circuit as claimed in claim 1, wherein the recording signal having the pulse width narrower than the standard pulse width is generated so as to be delayed by one pixel clock.

11. A recording signal generating circuit as claimed in claim 6, wherein the delay circuit delays the pixel clock by a time corresponding to less than 50% of the period of the pixel clock which has a 50% duty ratio.

12. A recording signal generating circuit as claimed in claim 1, wherein the storing means comprises five shaft registers which are cascade-connected and the shaft register located at the third stage stores the pixel information of the pixel of interest.

13. A recording signal generating circuit as claimed in claim 1, wherein the standard pulse width has an approximately 80% pulse width of the pixel clock, the wide pulse width which is generated when the isolated black pixel pattern is detected has an approximately 100% pulse width of the pixel clock, and the narrow pulse width which is generated when the isolated white pixel pattern is detected has an approximately 50% pulse width of the pixel clock.

14. A recording signal generating circuit as claimed in claim 1, wherein the image information is for a printer.

15. A recording signal generating circuit as claimed in claim 1, wherein the image information is for a facsimile machine.

16. A recording signal generating circuit as claimed in claim 1, wherein the image information is for a copier.

17. A recording signal generating circuit as claimed in claim 1, wherein the recording signal is used for driving a laser which emits light in response to the recording signal.

* * * * *